W. WRIGHT.
COMBINED TYPE WRITING AND COMPUTING MACHINE.
APPLICATION FILED JULY 8, 1912.
1,274,834.
Patented Aug. 6, 1918.
2 SHEETS—SHEET 1.
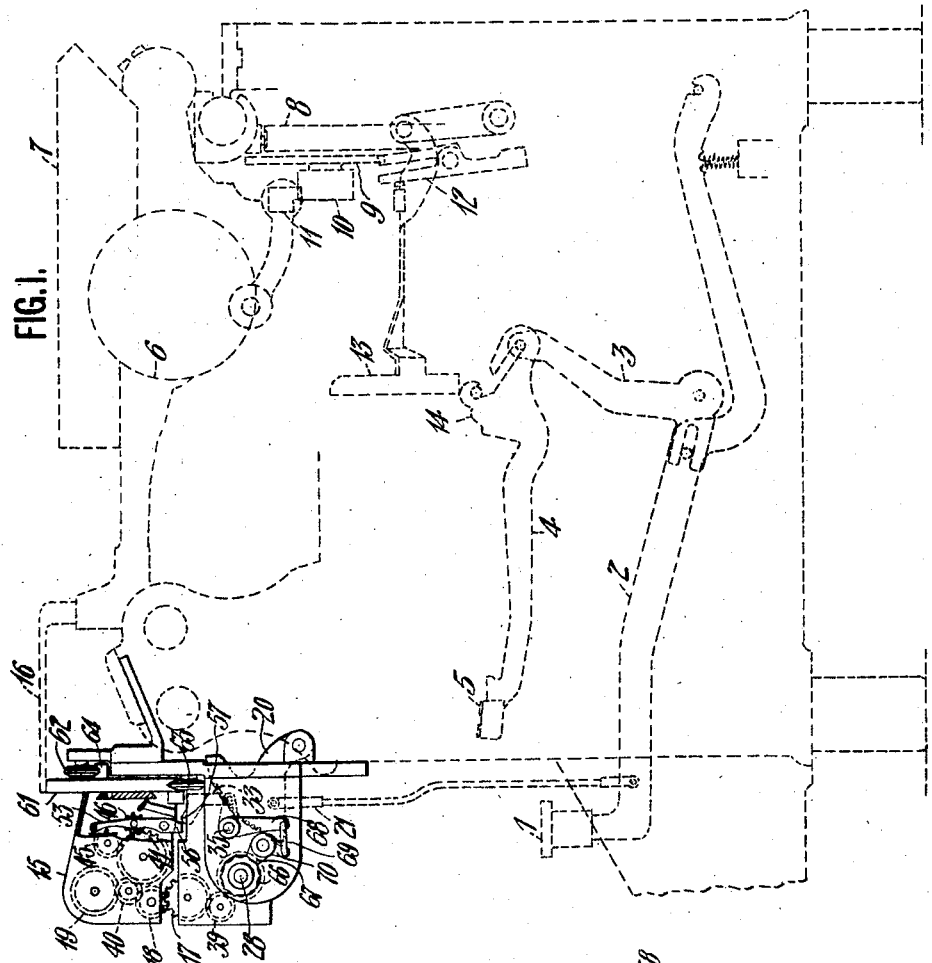
WITNESSES:
F. E. Alexander.
Titus H. Irons.
INVENTOR:
Walter Wright
BY
B. C. Stickney
ATTORNEY

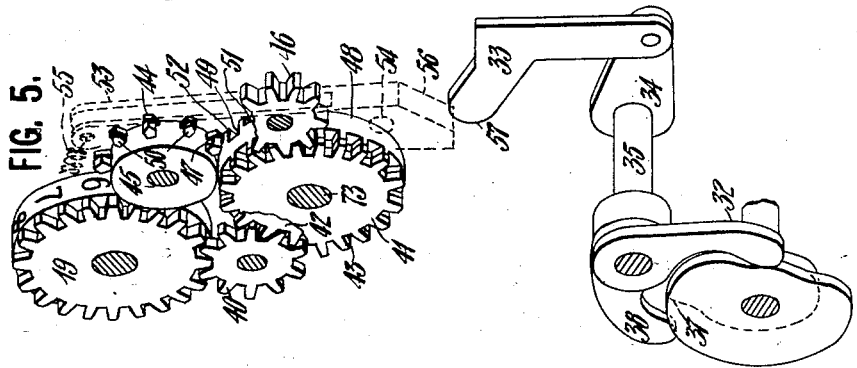
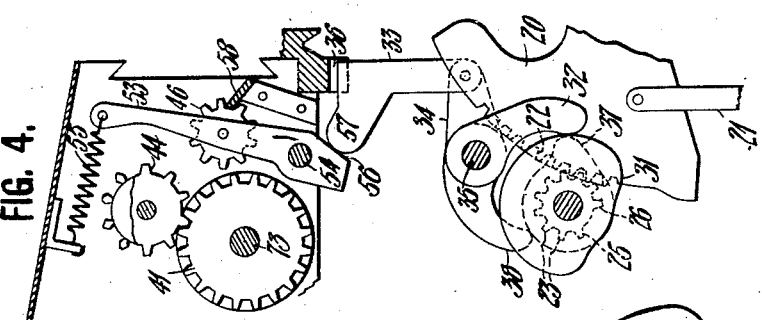
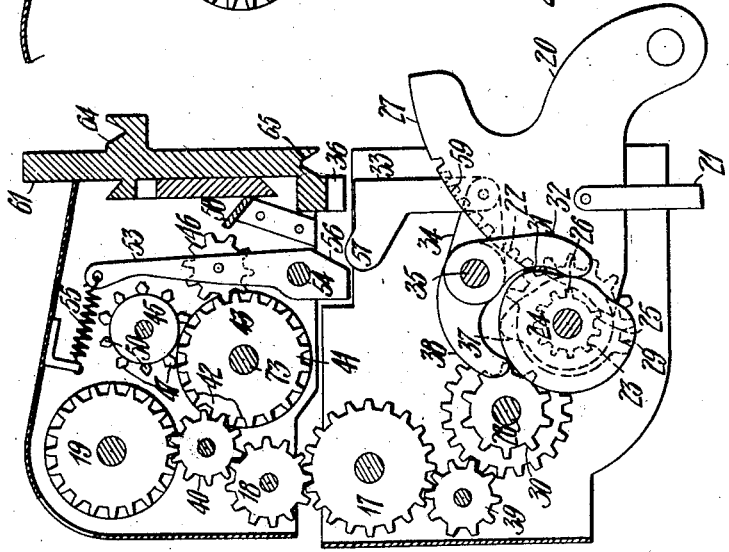

UNITED STATES PATENT OFFICE.

WALTER WRIGHT, OF NEW YORK, N. Y., ASSIGNOR TO UNDERWOOD COMPUTING MACHINE COMPANY, OF NEW YORK, N. Y., A CORPORATION OF NEW YORK.

COMBINED TYPE-WRITING AND COMPUTING MACHINE.

1,274,834.  Specification of Letters Patent.  Patented Aug. 6, 1918.

Application filed July 8, 1912. Serial No. 708,090.

*To all whom it may concern:*

Be it known that I, WALTER WRIGHT, a citizen of the United States, residing in New York city, in the county of New York and State of New York, have invented certain new and useful Improvements in Combined Type-Writing and Computing Machines, of which the following is a specification.

This invention relates to computing machines, and is herein illustrated as applied to an Underwood typewriting machine combined with a key-driven computing mechanism in which a master wheel is arranged to engage computing wheels *seriatim* to turn them.

Each computing wheel is preferably formed of two flat gear wheels or disks lying against each other, which are normally locked together to rotate as a unit by means of an idler coupling wheel, which meshes with both of said disks. One of said disks is constantly in mesh with the carry-over wheel governed by the computing wheel next lower in denomination, while the other disk is constantly in mesh with its dial wheel. Said latter disk is also arranged to form a Geneva lock for the carry-over wheel controlling the computing wheel next higher in denomination. When these two disks are held to revolve as a unit, it follows that the motion of one computing wheel through an entire revolution will turn its carry-over wheel once during said revolution, to the extent of one unit, and consequently turn the computing wheel governed by that carry-over wheel to the same extent. When, however, said idler coupling wheel is moved out of mesh, the two disks may rotate idly on each other, so that each dial wheel may be turned without affecting another.

In the preferred form of the mechanism which is herein shown, the computing wheels are formed separate from the dial wheels, and on these computing wheels the carry-over wheels are arranged to operate; said carry-over wheels normally holding each computing wheel locked by forming a Geneva lock with the computing wheel next lower in denomination. When a zero comes before the sight opening of the totalizer, the computing wheel is arranged to give the computing wheel next above it one-tenth of a revolution (or some aliquot portion thereof) by releasing the carry-over wheel, causing it to turn, and then locking it again.

For the units wheel there is no carry-over wheel which will ever operate it, and for this wheel there is shown a fixed disk corresponding to one portion of the computing wheel disks above referred to, and an idler coupling wheel is arranged to mesh with this and hold the said disk normally against rotation. When, however, the master wheel is in position to operate said units wheel, the depression of a numeral key will swing said idler coupling wheel out of position, so that said units wheel may be revolved freely by said key.

In the form herein illustrated, the computing mechanism is mounted in a totalizer which travels along as a unit with the typewriter carriage relatively to a master wheel. Upon the operation of any numeral key, said totalizer is locked against travel so that the master wheel cannot slide out of mesh with the computing wheel it engages, and at the same time the idler computing wheel is moved out of mesh with said computing wheel. The master wheel therefore is able to turn the computing wheel with which it engages.

For locking the totalizer there is preferably formed on its lower portion a rack, into which a locking pin is projected at the operation of any numeral key before the master wheel begins to turn, and preferably this pin comprises an extension which is arranged to swing *seriatim* the levers on which the several idler coupling wheels above mentioned are mounted. For this purpose said locking pin is preferably arranged in the same plane as the master wheel. The teeth of each coupling wheel as it swings outward are arranged to strike a bar which will hold said wheel against turning so that when swung inward, it will again mesh with its computing wheel.

Each dial wheel and computing wheel in the above described structure are normally locked from the corresponding wheel below by means of the associated carry-over wheel, except the units wheel, and that is locked by means of a fixed gear. It will therefore be seen that the whole computing mechanism may be arranged to be either positively locked or positively driven by the operation of any numeral key.

From what has been said above, it will be seen that the computing mechanism in the totalizer is always positively locked, and therefore held in meshing position, when it is not being driven by a numeral key. Further, the totalizer carriage is always locked when a numeral key is being operated, and the master wheel is always locked unless being turned by a key. It therefore follows that when in idle position, the various wheels will always be in position to mesh with each other; and if the totalizer carriage can be moved transversely, the teeth on the various wheels will be in meshing position, so that they cannot be broken off by striking teeth or wheels improperly placed. Therefore, it is impossible for a careless operator by any means without actually wrecking the machine, to injure the teeth of the computing mechanism.

Other features and advantages will hereinafter appear.

In the accompanying drawings,

Figure 1 is a fragmentary side view partly diagrammatic of an Underwood typewriting machine showing my invention attached thereto.

Fig. 2 is a sectional view through a totalizer, and the key-driven computing mechanism.

Fig. 3 is a plan view of a totalizer with part of the top cut away.

Fig. 4 is a fragmentary view similar to Fig. 2, showing fewer parts and showing the totalizer locked.

Fig. 5 is a fragmentary perspective view, showing the relation of a dial wheel, computing wheel, carry-over and locking mechanism.

Numeral keys 1 depress levers 2, swinging bell cranks 3, to swing type bars 4 upwardly and rearwardly, and cause type 5 to strike against a platen 6 mounted in a carriage 7. Said carriage is drawn forward in letter-feeding direction by means of a spring barrel 8 and is controlled in said travel by means of an escapement wheel 9 carrying a pinion 10 working in a rack 11 connected to said carriage, said escapement wheel 9 being governed by dogs 12 operated by a universal bar 13 moved by heels 14 on the type bars.

As said carriage 7 travels along, it carries along with it a totalizer 15 by means of an arm 16 connected to said carriage, and causes a master wheel 17 to be brought successively into meshing position with intermediate wheels 18, which intermediate wheels drive dial wheels 19 in a manner presently to be described.

As each numeral key is depressed, it turns said master wheel 17. To do this the key drags down its segment 20 by means of a link 21, and causes teeth 22 on said segment to successively mesh with teeth 23 on a combined locking and driving unit 24, and causes said unit to rotate until the end teeth 25 and 26 on said unit lock themselves, forming a Geneva lock with a smooth surface 27 at the upper end of said segment. Said locking and driving unit turns the master wheel through a main drive shaft 28 which the unit drives by means of teeth 29 formed on said unit, which mesh with teeth 30 on a wheel fast on said shaft 28.

Said shaft is preferably held normally locked by a universal lock described later, and on the turning of said unit 24, said shaft is released from said universal lock, but is held locked in a manner not herein shown, by means of a Geneva lock on said locking and driving unit 24, until the teeth 29 mesh with the teeth 30 on said main drive shaft. Then said teeth 29 rotate said main drive shaft to an extent dependent upon the numeral key operated. The unit shown in Fig. 2 comprises nine teeth 29 and is operated by the "9" numeral key 2. After the teeth 29 have completed their operation on said main drive shaft 28, the shaft may be locked by a Geneva lock not shown.

As said unit begins to rotate and before the first of said teeth 29 revolves to strike any tooth 30, it locks the totalizer 15 against travel. To do this a cam surface 31 fast on said unit moves a cam finger 32 to carry a flat locking pin or bar 33 positively upward into a rack 36 on the totalizer carriage. The connections for accomplishing this movement include a rock arm 34 fast on shaft 35 to which shaft said cam finger 32 is likewise fast. As said locking and driving unit 24 continues to rotate, it holds said cam finger 32 to hold pin 33 in locking engagement with rack 36 fast on the totalizer carriage. As said locking and driving unit 24 finishes its rotation, a cam 37 forming part of said unit, is brought around to strike a cam finger 38 fast on said shaft 35, and positively withdraws said locking pin 33 from said rack 36, thus releasing said totalizer when the numeral has been carried into the dial wheels 19.

To carry the numeral into said dial wheels, the main drive shaft 28 is arranged to operate master wheel 17 through an idle wheel 39, and said master wheel 17 operates said dial wheel 19 through intermediate wheels 18 and 40; said intermediate wheels 40 also meshing with a computing wheel 41 to form connection with a carry over mechanism.

Each computing wheel 41 comprises a main portion 42, which meshes with said intermediate wheel 40, and also comprises a toothed disk 43 which is constantly in mesh with teeth 44 of carry-over wheel 45, which carry-over wheel is governed by the computing wheel next lower in denomination. The main portion 42 of each computing wheel is caused to normally turn as a unit with its disk 43, by means of an idler coupling wheel 46, which meshes with both portions. When so meshing, the toothed disk 43 and consequently the whole computing wheel, is positively geared to the carry-over wheel 45 by means of its teeth 44. Each carry-over wheel 45 is held by a Geneva lock formed by the teeth 47 on the carry-over wheel which ride on the plane peripheral surface 48 of said carry-over wheel.

At one point in the circumference of said carry-over wheel, said surface 48 is broken by means of an indentation 49 which is arranged to receive one of the teeth 47, and so turn said carry-over wheel. To make certain of this turning, each carry-over wheel also comprises thin teeth 50 somewhat thinner than teeth 47 and alternating with them, which teeth normally ride in a slot 51 formed by a ledge of the main part of said computing wheel.

As a broad tooth 47 comes to said depression 49, the tooth 50 just behind said broad thin tooth 47 will be struck by a projection 52 extending from the margin of said opening 49 and filling up the ledge 51 cut in said computing wheel. This projection 52 compels the carry-over wheel 45 to start turning, and the broad tooth 47 standing over said opening 49 will sink into it, and compel the turning of said carry-over wheel through one unit. As said movement is completed, the broad tooth 47 rides out again on to the broad surface 48 of said carry-over wheel, and again locks said carry-over wheel against turning. This turning of the carry-over wheel which has just been described, turns the toothed disk 43 of the adjacent computing wheel through one unit space, because as has been said, the teeth 44 of said carry-over wheel are constantly in mesh with said disk, and the turning of the disk 43 locked to the main portion of the wheel by means of its coupler wheel 46, will compel the whole of said adjacent computing wheel to turn as a unit.

Each coupler wheel 46 is journaled on a swinging lever 53 pivoted on a rod 54 extending lengthwise of the totalizer, which swinging lever is normally drawn forward by means of a spring 55, so as to cause the idler coupling wheel 46 to normally mesh with its computing wheel 41, and lock the two portions 42 and 43 of said computing wheel together. Said springs 55 may be exceedingly light as said coupler wheels 46 carry no load, and therefore said springs 55 may offer no appreciable resistance to moving said coupler wheels 46 out of mesh with their computing wheels.

Said swinging levers 53 are each provided with a cam-faced projection 56, which is arranged to be struck by a finger 57 so as to swing the idler coupling wheel clear of its computing wheel; said finger 57 extending from the locking pin 33 as the pin rises to lock the totalizer against travel, thus providing an exceedingly simple method of locking the carriage, and unlocking the carry-over wheel. Said cam-face may be adjusted to give the easiest touch desirable to the keys as they operate it. As each swinging lever is swung outward in turn by means of the locking pin 33, it swings its idler coupling wheel 46 so that its teeth will strike and mesh with a bar 58, and hold said idler coupling wheel against revolving out of meshing position with its computing wheel 41, thus providing a positive protection against imperfect operation of the mechanism.

It will be seen more particularly from Fig. 2 that the initial portion of depression of a numeral key moves the segment 20 idly, and that after said segment and key have attained their velocity, the teeth 26 will mesh with the first tooth 22 of said segment, and start said locking and driving unit 24, and after said locking and driving unit has started, the cam finger 32 will swing outward and lock the totalizer, and unlock the computing wheel 41 by an exceedingly small movement. It will therefore be seen that the parts gradually attain momentum, and that the parts other than rotating parts, have very small range of movement, and consequently there is little inertia to be overcome in operating them. Also there are no strong springs to be overcome.

When a numeral key is released, and rises on its return stroke, the locking and driving unit is arranged to be locked by means of its teeth 25 and 26 which bear against a raised flat surface 59 formed on said segment 20 alongside of the teeth 22, in a manner not material to the present disclosure, and when the numeral key reaches the very end of said motion, the segment gives the locking and driving unit 24 a very slight rotation by means of its teeth 25 and 26, so that said tooth is in position to be struck by the first of the teeth 22 on the next operation of the segment.

The totalizer 15 may be mounted on a totalizer carriage 61 riding on wheels 62 and 63, on which travel tracks 64 and 65 on said carriage.

The main drive shaft 28 is normally held locked by means of a Geneva lock member 66 formed on the end thereof, comprising faces into which a locking arm 67 is arranged to be turned by means of a rock arm 68 on shaft 35, through link 69 and rock arm 70. It will be seen from Fig. 1 that the drive shaft 28 is either positively locked by said locking arm 67, or else the totalizer 15 is held locked by the locking pin 33, both of which locks are operated from the same shaft 35, so that either the totalizer is locked against travel, or else the master wheel is locked through the main drive shaft, so that the master wheel teeth must be in position to mesh with the teeth of the totalizer.

As has been pointed out above, the wheels on the totalizer are held alined by means of the train of carry-over mechanism, except when the computing wheel operated on for the moment is released by the moving out of its idler coupling wheel, and so these wheels are always held in position to mesh with the master wheel when not actually being turned. It will be therefore seen that it is impossible to have the gears in such position that the teeth of the master wheel will strip any other teeth by imperfect meshing with them, or by being moved transversely to them when not in meshing position.

Each computing wheel in the totalizer except the units wheel, as has been mentioned above is locked by means of a carry-over wheel from the computing wheel next lower in denomination. The units dial wheel may be identical with the other dial wheels, and may have in mesh with it a toothed wheel 71 like the toothed disk of the computing wheel, and a second similar toothed disk 72 may be mounted on the shaft 73 on which said computing wheels are journaled, but be held against rotation by means of a pin 74 fast in the wall of the totalizer.

An idler coupling wheel 46 precisely like all the other idler coupling wheels may be arranged to mesh with both these disks in the same manner as the other idler coupling wheels mesh with the two parts of their respective computing wheels. It will be seen that so long as the idler coupling wheel for the units dial wheel is in mesh with said disks 71 and 72, said dial wheel is locked against rotation, but may be released whenever the locking pin 33 moves said coupling wheel 46 out of mesh.

Variations may be resorted to within the scope of the invention, and portions of the improvements may be used without others.

Having thus described my invention, I claim:

1. In a computing machine, the combination with computing wheels, and a master wheel for driving them *seriatim;* of a carriage controlling the *seriatim* drive of said computing wheels; numeral keys controlling the travel of said carriage and the extent of rotation of said master wheel; a lock for said carriage; a device for both positively engaging and positively releasing said lock; means for actuating said device at the driving stroke of a numeral key, to engage said lock; means for actuating said device as said key completes said driving stroke, to release said lock; means for holding each computing wheel locked; and means operated by said carriage lock, during its engaging movement, to release from its holding means the then active computing wheel.

2. In a computing machine, the combination with computing wheels, and a master wheel arranged to engage them *seriatim*, of a traveling carriage controlling said engagement, keys for driving said master wheel and controlling said carriage, a rack on said carriage, a bar movable vertically into said rack to lock said carriage against travel, connections from said keys for positively moving said bar into and out of said rack, an arm extending from said bar, a lever moved by said arm and a coupling member carried by said lever, said computing wheels comprising separable portions arranged to be coupled by said coupling member.

3. In a computing machine, the combination with computing wheels, and a master wheel arranged to engage them *seriatim*, of a traveling carriage controlling said engagement, keys for driving said master wheel, and controlling said carriage, a rack fast on said carriage, a locking bar movable into said rack by the operation of any of said keys and provided with an extension, carry-over mechanism for said computing wheels forming a locked train, and means for breaking said train at each computing wheel comprising a swinging bar for each computing wheel provided with a cam arranged to be struck by the said extension of said locking bar.

4. In a computing machine, the combination with computing wheels, and a master wheel for driving the *seriatim;* of a carriage controlling the *seriatim* drive of said computing wheels; numeral keys controlling the travel of said carriage and the extent of rotation of said master wheel; means for holding each computing wheel locked unless driven by the master wheel at the depression of a numeral key; means for unlocking each computing wheel as the master wheel is about to drive it; a lock for said carriage; a device for both positively engaging and positively releasing said carriage lock; means for actuating said device at the driving stroke of a numeral key, to engage said carriage lock; and means for actuating said device as said key continues said driving stroke, to release said carriage lock and lock said master wheel.

5. In a computing machine, the combination with a plurality of computing wheels, and a master wheel for driving them *seriatim*, each computing wheel comprising a pair of relatively-revoluble toothed members; of a carriage controlling the *seriatim* drive of said computing wheels; numeral keys controlling the travel of said carriage and the extent of rotation of said master wheel; a plurality of carry-over wheels, each co-acting with one member of one computing wheel to be driven thereby, and with one member of another computing wheel to drive the same; an idle wheel individual to each computing wheel, normally engaging both members thereof, so as to cause them to rotate in unison; a swinging carrier-arm individual to each idle wheel; a lock for holding said carriage against travel, said lock operable at the actuation of a numeral key; and means acting, simultaneously with the operation of said lock, to rock the swinging arm associated with the computing wheel then being driven, for releasing the idle wheel carried thereby from said computing wheel.

6. In a computing machine, the combination with a plurality of computing wheels, and a master wheel for driving them *seriatim*, each computing wheel comprising a pair of relatively-revoluble toothed members; of a carriage controlling the *seriatim* drive of said computing wheels; numeral keys controlling the travel of said carriage and the extent of rotation of said master wheel; a plurality of carry-over wheels, each co-acting with one member of one computing wheel to be driven thereby, and with one member of another computing wheel to drive the same; an idle wheel individual to each computing wheel, normally engaging both members thereof, so as to cause them to rotate in unison; a swinging carrier-arm individual to each idle wheel; and a lock for holding said carriage against travel, said lock moved positively into engaging position at the actuation of a numeral key, and having an extension for simultaneously swinging to releasing position the carrier-arm associated with the computing wheel then being driven, for releasing the idle wheel carried thereby from said computing wheel.

7. The combination, with a plurality of computing wheels, each comprising relatively-rotatable driving and driven members; of a master wheel for rotating said computing wheels *seriatim* by their driving members; a plurality of unitary carry-over wheels, each engageable simultaneously with the driving member of one computing wheel and the driven member of the computing wheel of next higher denomination, to transfer the rotary movement of said driving member to said driven member; a coupling wheel associated with each computing wheel, to normally join together the two members thereof for rotation in unison; and key-operated means effective on said couplers *seriatim*, to release the coupler associated with the then active computing wheel, so as to permit relative rotation of its parts.

8. The combination, with a plurality of computing wheels, each comprising relatively-rotatable driving and driven members; of a master wheel for rotating said computing wheels *seriatim* by their driving members; a plurality of unitary carry-over wheels, each meshing with and driving the driven member of one computing wheel, and alternately locked and driven by the driving member of the computing wheel of next lower denomination, to periodically transfer the rotary movement of said driving member to said driven member; a coupling wheel associated with each computing wheel, to normally join together the two members thereof for rotation in unison; and key-operated means effective on said couplers *seriatim*, to release the coupler associated with the then active computing wheel, so as to permit relative rotation of its parts.

9. In a computing machine, the combination with computing wheels, of numeral keys for driving said wheels, each of said computing wheels split into two portions, one of said portions having thereon, a carry-over tooth, and the other portion having gear teeth, a series of coupling gears, each connected directly with said portions forming a train, and means connected to said numeral keys to enable said keys to move said coupling gears to break said trains *seriatim* preparatory to the driving of the computing wheels by the numeral keys.

10. In a computing machine, the combination, with computing wheels, and a master wheel for driving them *seriatim*, each computing wheel comprising separable parts; of a coupler engageable with the parts of each computing wheel, to join them together for rotation in unison; springs normally holding said couplers in such engagement; numeral keys for controlling the extent of rotation of the master wheel; means operated by the down-stroke of a numeral key, before the master wheel starts to turn, for swinging the coupler associated with the then active computing wheel to ineffective position; and means operated simultaneously with the said swinging of said coupler for preventing relative movement between said master wheel and said computing wheels, said preventing means being positively restored to normal, ineffective position by the key in completing its said downstroke.

11. In a computing machine, the combination with numeral keys, computing wheels and a master wheel for turning said computing wheels *seriatim* to an extent determined by the numeral keys operated, of means normally holding said computing wheels against turning, a device for releasing said holding means from the computing wheel momentarily engaged by the master wheel, a device for locking the master wheel from moving transversely to the computing wheels, and a member always turning in one direction for releasing said holding means and making said locking means effective and ineffective.

12. The combination with numeral keys and a series of computing wheels, each split into two portions, of a series of coupling gears, each coupling gear directly connecting the portions of its associated computing wheel, each coupling gear with its connected portions forming a train, each of said computing wheels having thereon a carry-over tooth, carriers for said coupling gears, a step-by-step traveling carriage, a movable lock operable by said keys for holding said carriage against travel, and a cam connected to said lock for releasing the coupling gears to break the trains *seriatim*.

13. In a computing machine, the combination with computing wheels, each formed of two separately rotatable wheels, of a coupling wheel movable into mesh with both of said wheels to cause the computing wheel to turn as a unit, and a member always rotating in the same direction for operating said coupling wheels *seriatim*.

14. The combination, with computing wheels and coupling gears connected therewith forming a train, of rocking carriers for said coupling gears, a traveling carriage, a lock having a substantially rectilinear movement into engagement with said carriage to hold the latter against travel, and a cam on said lock arranged beneath said carriers so as to engage and rock the same during the movement of the lock and thereby swing the coupling gears on said carriers away from the computing wheels to break the train.

15. In a computing machine, the combination with computing wheels, and a master wheel for turning them *seriatim*, of a member always revolving in one direction, a detaining device for each computing wheel, and means for releasing said detaining device and locking the master wheel against traveling relatively to the computing wheels by said member always revolving in one direction.

16. In a computing machine, the combination with numeral keys, computing wheels and a master wheel adapted to turn said computing wheels *seriatim* to an extent determined by the numeral keys operated, of a series of driving units, one for each computing wheel, driven by the numeral keys and adapted to have a substantially continuous movement in one direction until the computing operation is completed, a detaining means normally holding each computing wheel, and connections whereby each detaining means is moved to ineffective position by part of the corresponding driving unit only after the latter, as a whole, has attained a relatively high momentum by the key depression, and the master wheel is then turned by the key depression.

17. In a computing machine, the combination with numeral keys, computing wheels and a master wheel adapted to turn said computing wheels *seriatim* to an extent determined by the numeral keys operated, of spring-operated means normally holding each computing wheel, a series of driving units, one for each computing wheel, driven by the numeral keys and adapted to have a substantially continuous movement in one direction until the computing operation is completed, and connections whereby each holding means is moved to ineffective position by part of the corresponding driving unit only after the latter, as a whole, has attained a relatively-high momentum by the key depression, and the master wheel is then turned by the key depression.

18. In a computing machine, the combination with numeral keys and computing wheels, of a master wheel operated by the numeral keys and turning said computing wheels *seriatim*, means normally detaining each computing wheel against accidental revolution, a series of driving units, one for each computing wheel, driven by the numeral keys and adapted to have a substantially continuous movement in one direction until the computing operation is completed, connections whereby each detaining means is moved to ineffective position by part of the corresponding driving unit only after the latter, as a whole, has attained a relatively-high momentum by the key depression, and the master wheel is then turned by the key depression, and a member forming part of said connections adapted also to lock said master wheel against axial movement relative to said computing wheels.

19. The combination with computing wheels and coupling gears connected therewith forming a train, of rocking carriers for said coupling gears having inclined lower ends, a traveling carriage, a lock arranged for vertical upward movement into engagement with said carriage to hold the latter against travel, and a cam on said lock arranged beneath said carriers so as to engage and rock the same during the movement of the lock and thereby swing the coupling gears on said carriers away from the computing wheels to break the train.

20. The combination, with computing wheels and coupling gears connected therewith forming a train, of rocking carriers for said coupling gears, a traveling carriage provided with a rack, a lock having a substantially rectilinear movement into engagement with said rack to hold the carriage against travel, and a cam on said lock arranged beneath said carriers so as to engage and rock the same during the movement of the lock and thereby swing the coupling gears on said carriers away from the computing wheels to break the train.

21. In a computing machine, the combination, with computing wheels, a master wheel for driving them, and numeral keys for controlling the extent of movement of said master wheel; of means for normally holding said computing wheels against rotation; a traveling carriage controlling the drive of said computing wheels by said master wheel, a device operated at each descent of a numeral key for simultaneously releasing a computing wheel from its holding means and locking said carriage against movement; and means for positively restoring said device to normal position by the completion of the key descent, to unlock the carriage and permit the return of said holding means.

22. The combination with computing wheels forming a computing train and coupling gears forming part of said train, of an operating member for moving said coupling gears from effective to ineffective position and back to effective position, and means for operating said operating member including a wheel revolving continuously to throw said couplers out to ineffective position and in again to effective position.

23. The combination with computing mechanism comprising computing wheels forming a computing train and coupling gears forming part of said train, of an operating member for moving said coupling gears from effective to ineffective position and back to effective position, means for operating said operating member including a wheel revolving continuously to throw said couplers out to ineffective position and in again to effective position, a carriage, a lock for holding said carriage while the computing mechanism is being operated, and means for making said lock effective and then ineffective by said continuously revolving member.

24. The combination with computing wheels and coupling gears connected therewith forming a train, of connections whereby said couplers swing horizontally, a traveling carriage, a vertically moving lock for holding said carriage against travel, and a cam on said lock for so swinging said couplers horizontally.

25. In a computing machine, the combination with computing wheels and coupling gears therefor, of numeral keys, means connected to said keys for driving said wheels, connections whereby said keys positively move said couplers to ineffective position and restore them to effective position, and a member forming part of each key connection revolving continuously during the key depression to operate said couplers.

26. In a computing machine, the combination with computing wheels and coupling gears therefor, of numeral keys, means connected to said keys for driving said wheels, connections whereby said keys positively move said couplers to ineffective position and restore them to effective position, a carriage, a lock for holding said carriage, and means forming part of each key connection for positively moving said lock to effective position and back to ineffective position during and consequent upon the descent of a numeral key.

WALTER WRIGHT.

Witnesses:
F. E. ALEXANDER,
TITUS H. IRONS.

Copies of this patent may be obtained for five cents each, by addressing the "Commissioner of Patents, Washington, D. C."